United States Patent
Kobres

(10) Patent No.: US 11,144,916 B2
(45) Date of Patent: Oct. 12, 2021

(54) TECHNIQUES FOR CONDUCTING SINGLE OR LIMITED USE PURCHASES VIA A MOBILE DEVICE

(75) Inventor: Erick Kobres, Lawrenceville, GA (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 12/913,974

(22) Filed: Oct. 28, 2010

(65) Prior Publication Data
US 2012/0109826 A1    May 3, 2012

(51) Int. Cl.
G06Q 20/38    (2012.01)
G06Q 20/12    (2012.01)
G06Q 20/20    (2012.01)
G06Q 20/32    (2012.01)

(52) U.S. Cl.
CPC ......... *G06Q 20/385* (2013.01); *G06Q 20/12* (2013.01); *G06Q 20/20* (2013.01); *G06Q 20/204* (2013.01); *G06Q 20/322* (2013.01); *G06Q 20/382* (2013.01)

(58) Field of Classification Search
CPC ...... G06Q 20/12; G06Q 20/385; G06Q 20/20; G06Q 20/204; G06Q 20/322; G06Q 20/382
USPC ......................................................... 705/59
See application file for complete search history.

(56) References Cited

U.S. PATENT DOCUMENTS

| | | | | |
|---|---|---|---|---|
| 6,636,833 B1* | 10/2003 | Flitcroft | ............... | G06Q 20/00 235/380 |
| 7,814,009 B1* | 10/2010 | Frenkel | ............... | G06Q 20/04 705/26.8 |
| 8,132,236 B2* | 3/2012 | Hawkins et al. | ............... | 726/4 |
| 2001/0034717 A1* | 10/2001 | Whitworth | ............ | G07F 7/1008 705/64 |
| 2002/0107795 A1* | 8/2002 | Minear et al. | ............... | 705/40 |
| 2003/0032406 A1* | 2/2003 | Minear et al. | ............... | 455/410 |
| 2003/0033209 A1* | 2/2003 | Minear et al. | ............... | 705/26 |
| 2005/0098624 A1* | 5/2005 | Foss, Jr. | ............... | G06F 21/31 235/380 |
| 2009/0065571 A1* | 3/2009 | Jain | ............... | G06K 19/07739 235/379 |
| 2009/0156238 A1* | 6/2009 | Smith | ............... | 455/466 |
| 2009/0200371 A1* | 8/2009 | Kean | ............... | G06F 21/31 235/379 |

(Continued)

OTHER PUBLICATIONS

STAR(R) network unveils STAR CertiFlashTM. (Aug. 25, 2010). Business Wire, [retrieved on Jun. 15, 2021] [online] Retrieved from Dialog/ProQuest <URL: https://dialog.proquest.com/professional/docview/746812514?accountid=131444>. (Year: 2010).*

*Primary Examiner* — Abhishek Vyas
*Assistant Examiner* — Monica A Mandel
(74) *Attorney, Agent, or Firm* — Schwegman, Lundberg & Woessner

(57) ABSTRACT

A customer uses a mobile device to acquire a mobile app thereon. The mobile device is configured by a cloud-based service to escrow one or more card numbers mapped by a financial facility to the customer's primary account's number. Further security limitations can be configured into the mobile app by the cloud-based service. Subsequently, the customers uses the mobile app at a point-of-sale location to access one or more of the escrowed card numbers to make purchases; these purchases can be made while the mobile device lacks any connectivity to a network.

7 Claims, 3 Drawing Sheets

(56) References Cited

U.S. PATENT DOCUMENTS

| | | | |
|---|---|---|---|
| 2009/0266884 A1* | 10/2009 | Killian et al. | 235/380 |
| 2009/0307132 A1* | 12/2009 | Phillips | 705/41 |
| 2010/0125508 A1* | 5/2010 | Smith | G06Q 20/10 |
| | | | 705/16 |
| 2010/0125509 A1* | 5/2010 | Kranzley et al. | 705/17 |
| 2010/0138347 A1* | 6/2010 | Chen | 705/44 |
| 2010/0248779 A1* | 9/2010 | Phillips et al. | 455/556.1 |
| 2010/0262619 A1* | 10/2010 | Zargahi et al. | 707/770 |
| 2010/0262958 A1* | 10/2010 | Clinton et al. | 717/171 |
| 2011/0276378 A1* | 11/2011 | Pointer et al. | 705/14.17 |
| 2012/0116902 A1* | 5/2012 | Cardina et al. | 705/17 |

* cited by examiner

TECHNIQUES FOR CONDUCTING SINGLE OR LIMITED USE PURCHASES VIA A MOBILE DEVICE

BACKGROUND

Consumers are increasingly using automated mechanisms to perform every day transactions. Kiosks exist to avoid store personnel and lines. In addition to in-store purchasing technology exists to automated transactions online while at home or on the road via an online connection.

Traditional electronic-Wallet (eWallet) applications that escrow the live customer Primary Account's Number (PAN) information place the account at risk of compromise for skimming or device loss. That is, with eWallet transactions very little security exists such that businesses offering eWallet services often try to extract greater merchant fees from the merchants to cover the inherent security risks associated with one-click or streamlined online purchases. This is frustrating to merchants that feel trapped because they want to make a sale and having as many options as possible for a customer to pay increases the likelihood that more sales will likely occur.

Though banks have offered limited or single use card numbers for online purchases for a number of years, they typically require installation of special software on a Personal Computer (PC), and are intended primarily for electronic Commerce (eCommerce) payments.

In mobile environments, it is possible that eWallet users may encounter situations where they are offline, or in an environment where they prefer not to have data connectivity enabled—such as when travelling overseas where data coverage can be extremely high for users. With the traditional cloud-based eWallet, connectivity to the mobile device is required in order to complete a purchase.

In addition to this level of automation that is transforming the industry, consumers are performing more and more transactions using their cell or smart phones. For example, consumers can now use bar codes or QR codes to check in through airport security, make purchases at point-of-sale terminals via their phones, check in to sporting events, and others.

One overlooked area in the industry is limited or single user purchasing that can occur when the consumer is offline and without data connectivity.

SUMMARY

In various embodiments, techniques for conducting single or limited use purchases via a mobile device are presented. According to an embodiment, a method for automated purchasing via a mobile device is provided.

Specifically, a request is received for initial configuration of a mobile application that processes on a mobile device of a customer. Next, a policy for security restrictions to be placed on usage of the mobile application is acquired. Finally, configuration instructions are sent to a requesting device, which made the request to configure the mobile application, when activated on the mobile device with the security restrictions. The mobile application configured to acquire a single or limited use card number that maps to a personal account number (PAN) at a financial institution for the customer. Also, the single or limited use card number downloaded to the mobile application for use at a point-of-sale location to make a purchase and the purchase made without accessing a wide-area network (WAN) or cellular network connection.

DETAILED DESCRIPTION

Figure 1:
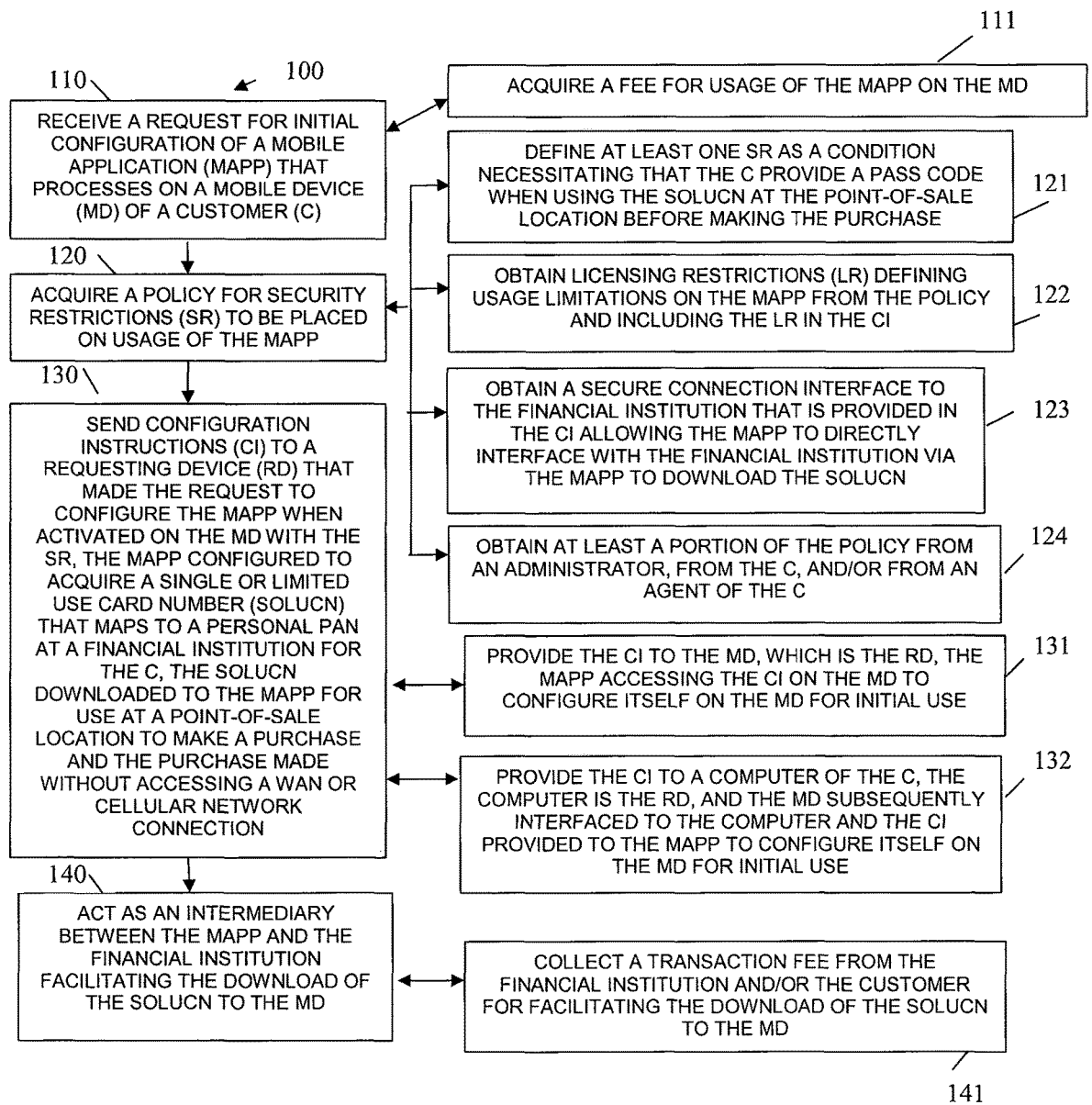
FIG. 1 is a diagram of a method for automated purchasing via a mobile device is provided, according to an example embodiment.

FIG. 1 is a diagram of a method 100 for automated purchasing via a mobile device is provided. The method 100 (hereinafter "cloud-based mobile device purchasing configuring service") is implemented as instructions programmed and residing on a non-transitory computer-readable (processor-readable) storage medium and executed by one or more processors. The processors are specifically configured and programmed to process cloud-based mobile device purchasing configuring service. The cloud-based mobile device purchasing configuring service operates over a network. The network is wired, wireless, or a combination of wired and wireless.

In an embodiment, the network is the Internet. In another embodiment, the network is a cellular network. It may also be that the network uses both the Internet and a cellular network.

In an embodiment, the cloud-based mobile device purchasing configuring service executes on one or more processors over the network in a cloud processing environment.

Cloud computing is often defined as computing capabilities that provide an abstraction between computing resources and the underlying technical architecture (e.g., servers, storage, networks), enabling convenient, on-demand network access to a shared pool of configurable computing resources that can be rapidly provisioned and released with minimal management effort or service provider interaction. From the perspective of the user, where and how a computing resource is obtained is irrelevant and is transparent in cloud computing.

As used herein a "cloud processing environment" refers to a set of cooperating computing resources, such as machines, storage, software libraries, software systems, etc. that form a logical computing infrastructure.

So, the cloud-based mobile device purchasing configuring service is cloud or server based and interacts with a customer's cell phone, smart phone, tablet, Personal Digital Assistant (PDA), and other smart portable devices of the customer. It is noted that the use of the phrase "mobile device" includes any of the above-mentioned devices of a customer.

In addition, the customer's mobile device includes an application (mobile app) either provided by the cloud-based mobile device purchasing configuring service or previously acquired from a mobile app server or store by the customer and downloaded to the customer's mobile device. The interactions between the cloud-based mobile device purchasing configuring service and the mobile app are described herein from the perspective of the cloud-based mobile device purchasing configuring service. The discussion of the FIG. 2, below, discusses processing from the perspective of the mobile app. It is also noted that the mobile app is offline or can be offline when conducting point-of-sale transactions after some initial and previous interactions with the cloud-based mobile device purchasing configuring service, as further discussed herein and below. However, being online or connected to a network is not a prerequisite and is not required for the mobile device, via the mobile app, to complete a purchasing transaction at a point-of-sale location.

That is, to initially configure the mobile app of the customer's mobile device connectivity to the cloud-based mobile device purchasing configuring service is used. Again, there is no connectivity needed at all by the customer's mobile device when the customer uses the mobile device and the mobile app to make an in-store point-of-sale transaction. However, it should be also noted that online purchases can also be made via the mobile app using the escrowed credit-card numbers stored on the mobile device and described below.

So, embodiments herein describe techniques where the mobile app downloads and escrows one or more single or limited use card numbers (securely associated with the customer's PAN), via the cloud-based mobile device purchasing configuring service, which can then be presented at point-of sale locations for purchasing, regardless of whether or not the mobile device is online at the time of purchase.

Upon exhaustion of the escrowed card numbers, the user can elect to escrow one or more additional card numbers, using a Personal Identification Number (PIN) or other access control method (such as Short Messaging Service (SMS) verification, biometrics, etc.) for future use. In this way, the customer can elect to download, via the cloud-based mobile device purchasing configuring service, additional card numbers when connected through a preferred connection method to the cloud-based mobile device purchasing configuring service (cell network, Internet, etc.).

For example, the escrowed cards can be loaded when the mobile device is connected at a WiFi hotspot to the cloud-based mobile device purchasing configuring service, or when the mobile device is synchronized with the customer's PC. This has particular utility for travelers who frequently find themselves overseas, where cellular data connectivity may be cost prohibitive, or altogether unavailable. It also has utility for environments where there may be poor data coverage at the point of purchase.

It should also be noted, that the cloud-based mobile device purchasing configuring service does not have to distribute the escrowed card numbers to the mobile app but this can be the case in some embodiments. So, in some cases the cloud-based mobile device purchasing configuring service configures the mobile app to interact with one or more financial institutions and their online systems to initially download the escrowed card numbers.

From a loss-prevention perspective, the customer's primary account number (again PAN) is never at risk, since it is not loaded onto the mobile device. Additionally, the mobile app of the mobile device can be configured to require a PIN at the time of presentation, at the time of reload, or both. Likewise, the number of cards to load, as well as the transaction or supplier (vendor type) code limits imposed on the cards can be configured either within the mobile app by the cloud-based mobile device purchasing configuring service, or by the administrator of the program (examples: corporate Test & Evaluation (T&E) department or a parent where the parent is providing the features to a child). In this later case, the administrator or parent can interact with the cloud-based mobile device purchasing configuring service to set limits. This level of protection of the customer PAN allows for favorable arguments for card-present exchange rates to be the same or similar to existing card exchange rates, as there is limited loss, and as a unique per-card Card Verification Value (CVV) or Card Identification (CID) number is generated for each transaction.

While techniques provided herein do not need to specify the method of storage of the escrowed card data on the mobile device, via the mobile app, it does assume that the escrowed cards are stored in an encrypted data store on the device that can be unlocked using an authentication token provided by the customer at the time of purchase via the mobile device. In some cases, the authentication token is a pass code, such as, but not limited to, a PIN.

The above description provides a sample overview of some of the embodiments capable with the teachings presented herein. The actions of the mobile app or actions initiated by the customer via a mobile device are described below with reference to the FIG. 2. The cloud-based mobile device purchasing configuring service is described now with reference to the FIG. 1.

At 110, the cloud-based mobile device purchasing configuring service receives a request for initial configuration of a mobile app (processing of mobile app described below with reference to the FIG. 2). The mobile app processes on a mobile device of a customer. The request can originate in a variety of manners. For example, the mobile app itself can originate the request when it is first executed on the mobile device. In another case, a laptop or computer that interacts with the mobile device can initiate the request.

According to an embodiment, at 111, the cloud-based mobile device purchasing configuring service acquires a fee for usage of the mobile app on the mobile device.

At 120, the cloud-based mobile device purchasing configuring service acquires a policy for security restrictions to be placed on usage of the mobile app on the mobile device. This can occur in a variety of manners and be related to a variety of security restrictions and in some cases other restrictions.

For example, at 121, the cloud-based mobile device purchasing configuring service defines at least one security restriction as a condition necessitating that the customer provide a pass code when using the single or limited use card number at a point-of-sale location (via a point-of-sale terminal) before the customer is permitted to make the purchase. That is, the customer cannot access and pass the single or limited use card number to the point-of-sale terminal until a pass code is successfully entered by the customer on the mobile device, via the mobile app.

In another case, at 122, the cloud-based mobile device purchasing configuring service obtains licensing restrictions, which define usage limitations on the mobile app. The licensing restrictions also acquired from the policy and are included in configuration instructions (discussed below with reference to the processing at 130). So, specific usage restrictions pursuant to a license can be configured in the mobile app via the cloud-based mobile device purchasing configuring service as defined via the policy.

In another situation, at 123, the cloud-based mobile device purchasing configuring service obtains a secure connection interface to the financial institution. The secure interface mechanism is provided in configuration instructions thereby allowing the mobile app to directly interface with the financial institution for purposes of downloading the single or limited use card number.

In yet another circumstance, at 124, the cloud-based mobile device purchasing configuring service obtains at least a portion of the policy from an administrator, from the customer, and/or from an agent of the customer. An agent of the customer may include a parent of a child that is the customer. Also, other agents are possible, such as an employer of an employee, where the employee is the customer, and others. Moreover, an entirely separate online interface can be used to access this aspect of the cloud-based mobile device purchasing configuring service that is independent of the mobile app. Although, the mobile app may also be capable of accessing this aspect of the cloud-based mobile device purchasing configuring service during subsequent connections after the initial configuration for purposes of altering aspects of the policy. Still further, access rights may define who and what can be changed with respect to the policy.

At 130, the cloud-based mobile device purchasing configuring service sends configuration instructions to a requesting device that made the request to configure the mobile app when activated on the mobile device with the security restrictions. That is, the security restrictions and other restrictions defined in the policy are provided within the configuration instructions to permit the mobile app to be properly configured for usage on the mobile device. Still further, the mobile app is configured to subsequently acquire a single or limited use card number that maps to a PAN of the customer at a financial institution of the customer. The single or limited use card number when presented to a merchant can be sent to the financial institution where it is linked to the PAN and the transaction is permitted to proceed (of course this is circumscribed by the terms of the single or limited use card number).

So, the single or limited use card number is downloaded and escrowed within the mobile device via the mobile app. The single or limited use card number is used at a point-of-sale location (via a point-of-sale terminal) to make a purchase made without accessing a Wide Area Network or a cellular connection via the mobile device. What this means, is the single or limited use card number is not dependent and does not need a connection to access a financial institution or any other third-party service to be provided via the mobile app to the point-of-sale terminal to make the purchase.

According to an embodiment, at 131, the cloud-based mobile device purchasing configuring service provides the configuration instructions to the mobile device. Here, the mobile device is the requesting device and the mobile app accesses the configuration instructions on the mobile device to configure itself on the mobile device for initial use by the customer.

In another case, at 132, the cloud-based mobile device purchasing configuring service provides the configuration instructions to a computer (laptop, tablet, a device other than the mobile device) of the customer. Here, the computer is the requesting device. The mobile device subsequently is interfaced to the computer and the configuration instructions provided to the mobile app. Again, the mobile app uses the configuration instructions to configure itself on the mobile device for initial use by the customer.

According to an embodiment, at 140, the cloud-based mobile device purchasing configuring service acts as an intermediary between the mobile app and the financial institution for purposes of facilitating the download (and escrowing) of the single or limited use card number on the mobile device. It is noted that in some other cases, the mobile app can directly interact with the financial institution to download and escrow the single or limited use card number.

Continuing with the embodiment of 140 and at 141, the cloud-based mobile device purchasing configuring service can also collect a fee from the financial institution and/or the customer for facilitating the download of the single or limited use card number.

In still more cases, the cloud-based mobile device purchasing configuring service can include in the configuration instructions (as discussed above) processing for recording point-of-sale transactions used by the mobile app and may pursuant to any licensing restrictions also included in the configuration instructions charge a transaction fee for each transaction or for transactions over a predefined threshold. The collection of the fees can be automatic via an account of the customer (when authorized by the customer) or can be via an online statement sent periodically to the customer for satisfaction.

Figure 2:
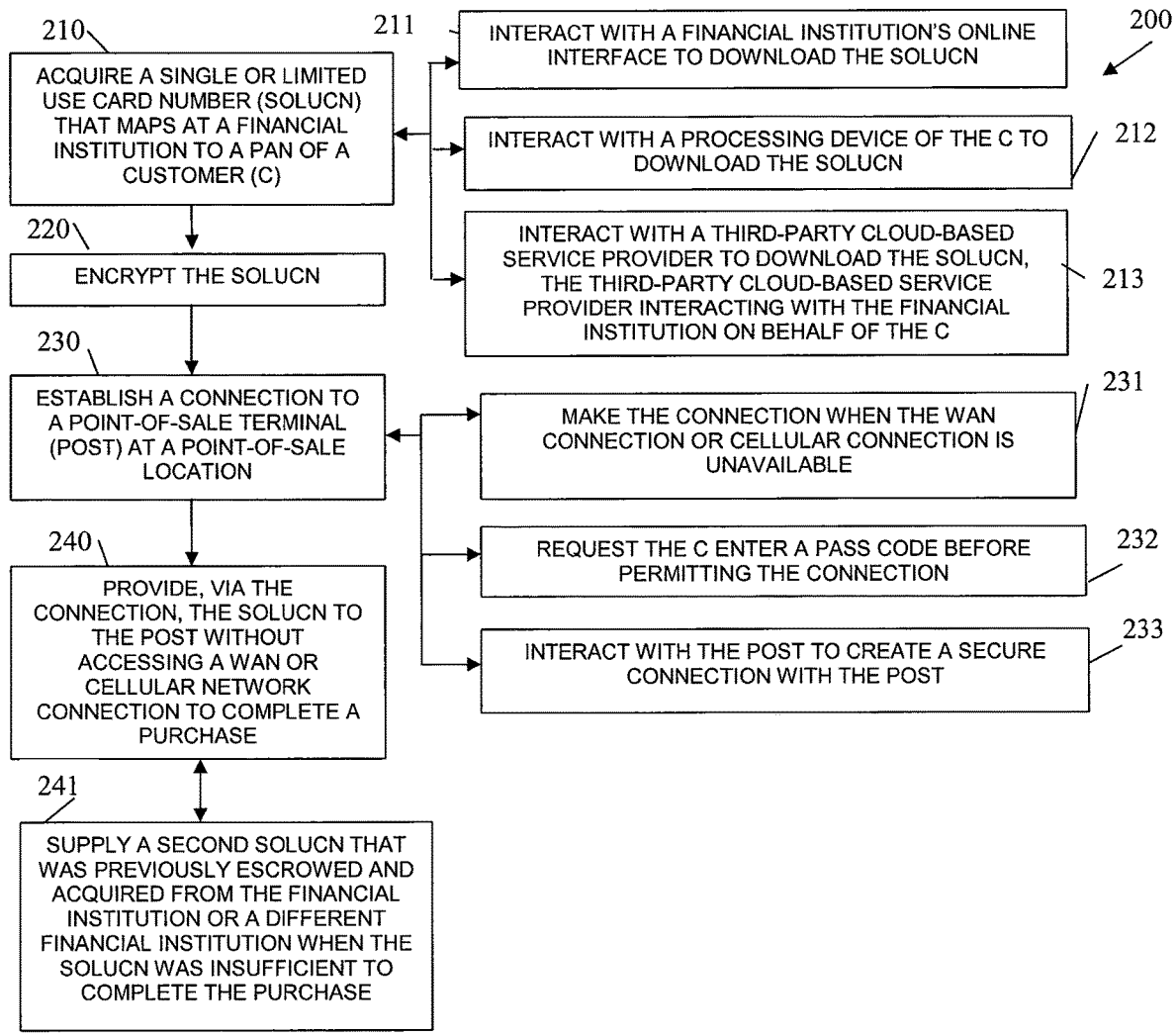
FIG. 2 is a diagram of another method for automated purchasing via a mobile device is provided, according to an example embodiment.

FIG. 2 is a diagram of another method 200 for automated purchasing via a mobile device is provided, according to an example embodiment. The method 200 (hereinafter "mobile app purchasing service") is implemented as instructions and programmed within a non-transitory computer-readable (processor-readable) storage medium that executes on one or more processors of a mobile device (as defined above); the processors of the mobile device are specifically configured to execute the mobile app purchasing service. The mobile app purchasing service is operational over a network; the network is wired, wireless, or a combination of wired and wireless. Although it is noted that purchasing transactions performed by the mobile do not require any network connectivity whatsoever.

The mobile app purchasing service again describes processing actions from the perspective of the customer's mobile device. The processing is associated with purchasing at a point-of-sale location, the mobile app initially configured and perhaps acquired by the method 100 of the FIG. 1.

At 210, the mobile app purchasing service acquires a single or limited use card number that maps at a financial institution to a PAN or a customer. This can occur in a number of manners.

For example, at 211, the mobile app purchasing service interacts with a financial institution's online interface to download the single or limited use card number.

In another situation, at 212, the mobile app purchasing service interacts with a processing device of the customer (other than the mobile device that the mobile app purchasing service executes on) to download the single or limited use card number. Here, the processing device of the customer is used to interact with the financial institution's online interface to download the single or limited use card number and the mobile app purchasing service is subsequently interfaced to the processing device to download and escrow the single or limited use card number. This is particular useful for travelers out of the country where the customer can download multiple single or limited use card numbers and when one is depleted, the traveler interfaces the mobile app purchasing service, via the mobile device, to the traveler's laptop and downloads and escrows another number to the mobile device for use. So, no Internet or even cellular connection is needed by the traveler to make this happen.

In still another case, at 213, the mobile app purchasing service interacts with a third-party cloud-based service provider (such as the method 100 of the FIG. 1) to download the single or limited use card number. Here, the third-party cloud-based service provider interacts with the financial institution on behalf of the customer.

At 220, the mobile app purchasing service encrypts the single or limited use card number within the mobile device.

Any form of encryption can be used; in some cases a public key of a configuring service (such as method 100 of the FIG. 1) can be used with a private key maintained on the mobile device to perform encryption and decryption. Of course, other forms of encryption can be used and perhaps even custom defined via the mobile app purchasing service.

At 230, the mobile app purchasing service establishes a connection to a point-of-sale terminal at a point-of-sale location. Here, the connection to the point-of-sale terminal is point-to-point (or local based on a self-contained WiFi service of the merchant) and occurs in a communication session that is separate and distinct and at a different time from that which was associated with the processing of 210-220.

According to an embodiment, at 231, the mobile app purchasing service makes the connection when a wide-area network (WAN) and cellular network is unavailable to the mobile device and therefore unavailable to the mobile app purchasing service. So, once again the mobile app purchasing service supplies the single or limited use card number to the point-of-sale terminal without regard to whether there is any network connection. The connection between the mobile app purchasing service and the point-of-sale terminal is point-to-point, peer-to-peer (P2P), or self-contained WiFi of the merchant. Thus, no WAN or cellular network is needed.

In an embodiment, at 232, the mobile app purchasing service requests the customer to enter a pass code before permitting the connection with the point-of-sale terminal. It may also be that pass code is requested after the connection but before the mobile app purchasing service supplies the single or limited use card number to the point-of-sale terminal via the connection.

In still another case, at 233, the mobile app purchasing service interacts with the point-of-sale terminal to create a secure connection with the point-of-sale terminal. So, challenge-response interactions can be initiated or even a key can be supplied by the point-of-sale terminal for the mobile app purchasing service to encrypt interactions over the connection.

According to an embodiment, at 240, the mobile app purchasing service supplies a second single or limited use card number that was previously escrowed and acquired from the financial institution or a different financial institution when the single or limited use card number was insufficient to complete the transaction. Insufficiencies can occur for a variety of reasons, such as denial by the financial institution of the provided single or limited use card number, insufficient of funds available to fully complete the purchase using the single or limited use card number, and the like.

Figure 3:
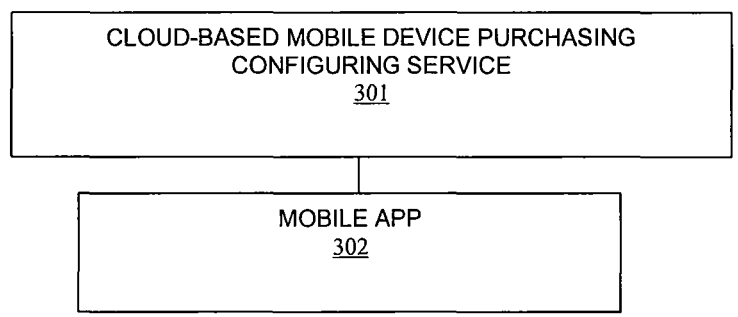
FIG. 3 is a diagram of an automated mobile-device purchasing system, according to an example embodiment.

FIG. 3 is a diagram of an automated mobile-device purchasing system 300, according to an example embodiment. The automated mobile-device purchasing system 300 includes one or more processors that are specifically configured to perform, inter alia, the processing associated with the methods 100 and 200 of the FIGS. 1 and 2, respectively. The automated mobile-device purchasing system 300 may also include a variety of other hardware components, such as network adapters, memory, display screen(s), input mechanisms, and the like. Furthermore, the automated mobile-device purchasing system 300 is operational over a network and the network can be wired, wireless, or a combination of wired and wireless. In an embodiment, the network is the Internet. In another case, the network is a cellular network. It may also be that the network uses both the Internet and a cellular network. It is also noted that direct purchasing transactions at a point-of-sale do not require any network connectivity. So, some operations of the automated mobile-device purchasing system 300 require no network connectivity at all.

The automated mobile-device purchasing system 300 includes a cloud-based mobile device purchasing configuring service 301 and a mobile app 302. Each of these and their interactions with one another will now be discussed in turn.

One or more processors in a cloud-processing environment are configured to execute the cloud-based mobile device purchasing configuring service 301. The cloud-based mobile device purchasing configuring service 301 resides and is programmed in a non-transitory computer-readable storage medium and again executes on the one or more processors of the cloud-processing environment. Example processing features associated with the cloud-based mobile device purchasing configuring service were presented above in detail with reference to the FIG. 1.

The cloud-based mobile device purchasing configuring service 301 is configured to interact with the mobile app 302 that processes on a customer's mobile device (cell phone, smart phone, tablet, PDA, etc.). The cloud-based mobile device purchasing configuring service 301 is configured to configure the mobile app 302 for use on the mobile device of the customer. Again, the features and types of configuration performed by the cloud-based mobile device purchasing configuring service 301 were presented above with reference to the method 100 of the FIG. 1.

The mobile app 302 resides within and is programmed in a non-transitory computer readable medium and is adapted to be downloaded and installed on a portable device (mobile device) of a customer, such as a cellular phone, a smart phone, a tablet, a PDA, and the like. The mobile device includes one or more processors that execute the mobile app 302. Some features of the mobile app 302 were presented above with reference to the FIG. 2.

The mobile app 302 is configured to complete purchases made by the customer at point-of-sale terminals using single or limited use card numbers that map at one or more financial institutions to PANs of the customer. The purchases are made via the mobile app 302 without the assistance of a WAN or cellular network being used or even available to the mobile device.

According to an embodiment, the mobile app 302 is configured to supply one or more of the single or limited use card numbers during different purchasing transactions that occurs online and via a WAN or cellular network connection. So, the mobile app 302 can also be used to supply the single or limited use card numbers for purchasing transactions online.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method for enforcing security on purchases, the method executed by one or more processors of a cloud processing environment and executed by one or more processors of a mobile device, the method comprising:

receiving, by executable instructions represented as a cloud-based mobile device purchasing configuring service that executes on the one or more processors of the cloud processing environment, a request for initial configuration of a mobile application that processes on the mobile device of a customer, the request received from the mobile device and the mobile device one of: a smart phone operated by the customer and a tablet operated by the customer;

acquiring by the cloud-based mobile device purchasing configuring service, a policy comprising security restrictions that are to be enforced during usage of the mobile application;

obtaining, by the cloud-based mobile device purchasing configuring service, access rights defining who can change the policy and defining what can be changed within the policy; and sending, by the cloud-based mobile device purchasing configuring service, configuration instructions that comprise the security restrictions to the mobile device when the mobile application is activated on the mobile device; and managing, by the cloud-based mobile device purchasing configuring service, any changes requested in the policy and the security restrictions based on the access rights;

wherein the mobile application executed by the one or more processors of the mobile device based on the configuration instructions causes the one or more processors of the mobile device to perform operations comprising:

configuring for interaction with the cloud-based mobile device purchasing configuring service by processing the configuration instructions;

recording any mobile device transactions made by the mobile application pursuant to licensing restrictions that are also defined in the configuration instructions;

acquiring and then encrypting a plurality of single use card numbers, each single use card number maps to a personal account number (PAN) at a financial institution for the customer;

storing the single use card numbers in an encrypted data store on the mobile device;

recording a purchase made with a particular stored single use card number at a point-of-sale location and enforcing the licensing restrictions during the purchase;

enforcing any transaction and vendor limits placed on purchases with the single use card numbers;

processing a second purchase with the mobile device using a second single use card number without regard as to whether the mobile device has a cellular connection to or has access to a Wide-Area Network (WAN) connection to the cloud processing environment through interaction between the mobile device and a Point-Of-Sale (POS) terminal;

charging an extra fee for each transaction that exceeds a predefined threshold number of transactions, and thereby enforcing security on purchases made with the single use card numbers, wherein the PAN is not loaded on the mobile device;

requiring a Personal Identification Number (PIN) be supplied by the customer each time one of the single use cards are presented on a display of the mobile device;

requiring the PIN each time the mobile device reloads a given presentation of a given presented single use card within the display of the mobile device; and upon exhaustion of the single use cards on the mobile device and a selection made by, the user through the mobile application, obtaining one or more additional single use cards from the financial institution after entry of the PIN by the user, each additional single use card mapped to the PAN.

2. The method of claim 1, wherein receiving further includes acquiring a fee for usage of the mobile application on the mobile device.

3. The method of claim 1, wherein acquiring the policy further includes obtaining the licensing restrictions defining usage limitations on the mobile application from the policy.

4. The method of claim 1, wherein acquiring the plurality of single use card numbers further includes obtaining a secure connection interface to the financial institution that is provided in the configuration instructions allowing the mobile application to directly interface with the financial institution via the mobile application to download the particular single use card number.

5. The method of claim 1, wherein acquiring the policy further includes obtaining at least a portion of the policy from an administrator, from the customer, and/or from an agent of the customer.

6. The method of claim 1, wherein sending further includes providing the configuration instructions to the mobile device, the mobile application accessing the configuration instructions on the mobile device to configure itself on the mobile device for initial use.

7. The method of claim 1, wherein sending further includes providing the configuration instructions to a computer of the customer, the computer interfaced to the mobile device, the mobile device a different device from the computer, and the mobile device subsequently interfaced to the computer and the configuration instructions provided to the mobile application to configure itself on the mobile device for initial use.

* * * * *